US012045074B1

(12) United States Patent
Chuang

(10) Patent No.: US 12,045,074 B1
(45) Date of Patent: Jul. 23, 2024

(54) BANDGAP VOLTAGE REFERENCE CIRCUIT TOPOLOGY INCLUDING A FEEDBACK CIRCUIT WITH A SCALING AMPLIFIER

(71) Applicant: TEXAS INSTRUMENTS INCORPORATED, Dallas, TX (US)

(72) Inventor: Shang-Yuan Chuang, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/148,430

(22) Filed: Dec. 29, 2022

(51) Int. Cl.
*G05F 3/30* (2006.01)
*G05F 1/575* (2006.01)

(52) U.S. Cl.
CPC ................ *G05F 1/575* (2013.01); *G05F 3/30* (2013.01)

(58) Field of Classification Search
None
See application file for complete search history.

(56) References Cited

U.S. PATENT DOCUMENTS

| | | | | |
|---|---|---|---|---|
| 5,061,862 A * | 10/1991 | Tamagawa | G05F 3/30 327/563 |
| 5,719,326 A * | 2/1998 | Vulih | G01L 23/225 701/111 |
| 5,861,771 A * | 1/1999 | Matsuda | G05F 1/465 327/543 |
| 6,198,266 B1 * | 3/2001 | Mercer | G05F 1/575 323/280 |
| 6,407,622 B1 * | 6/2002 | Opris | G05F 3/30 327/539 |
| 7,969,127 B1 * | 6/2011 | Megaw | G05F 1/613 323/901 |
| 10,739,801 B2 * | 8/2020 | Tang | G05F 1/575 |
| 10,928,846 B2 * | 2/2021 | Hashemi | G06F 1/28 |
| 2006/0001099 A1 * | 1/2006 | Motz | H01L 29/7816 257/E29.256 |
| 2006/0170407 A1 * | 8/2006 | Messager | G05F 1/575 323/313 |
| 2018/0052481 A1 * | 2/2018 | Aboudina | G05F 3/267 |

* cited by examiner

*Primary Examiner* — Thomas J. Hiltunen
(74) *Attorney, Agent, or Firm* — John R. Pessetto; Frank D. Cimino

(57) ABSTRACT

A bandgap voltage reference circuit includes: a bandgap voltage reference (VBG) core having a power input and first and second terminals; a bandgap operational amplifier (BGOA) having an operational amplifier output and first and second terminals, the first terminal of the BGOA coupled to the first terminal of the VBG core, and the second terminal of the BGOA coupled to the second terminal of the VBG core; and a feedback circuit having a feedback input and a feedback output, the feedback input coupled to the operational amplifier output, and the feedback output coupled to the power input. The feedback circuit includes a scaling amplifier having an inverting input, a non-inverting input, and a scaling amplifier output.

10 Claims, 8 Drawing Sheets

BANDGAP VOLTAGE REFERENCE CIRCUIT TOPOLOGY INCLUDING A FEEDBACK CIRCUIT WITH A SCALING AMPLIFIER

BACKGROUND

Many electronic devices use voltage regulators. Such voltage regulators vary with regard to input voltage or range, output voltage or range, and performance parameters (e.g., power efficiency, output voltage (VOUT) ripple, resistance to temperature change, resistance to input voltage variance, resistance to electromagnetic interference (EMI), etc.). One type of voltage regulator is called a bandgap voltage reference (VBG) circuit. VBG circuits are designed to provide a constant direct-current (DC) voltage reference (VREF) output regardless of DC input voltage (VIN) variance, temperature variance, and loading variance.

SUMMARY

In an example, a bandgap voltage reference circuit includes: a bandgap voltage reference (VBG) core having a power input and first and second terminals; a bandgap operational amplifier (BGOA) having an operational amplifier output and first and second terminals, the first terminal of the BGOA coupled to the first terminal of the VBG core, and the second terminal of the BGOA coupled to the second terminal of the VBG core; and a feedback circuit having a feedback input and a feedback output, the feedback input coupled to the operational amplifier output, and the feedback output coupled to the power input. The feedback circuit includes a scaling amplifier having an inverting input, a non-inverting input, and a scaling amplifier output.

In another example, an integrated circuit includes a bandgap voltage reference circuit having a power input and a bandgap voltage reference output. The bandgap voltage reference circuit includes a feedback circuit coupled between the power input and the bandgap voltage reference output. The feedback circuit includes a scaling amplifier. The bandgap voltage reference circuit is configured to provide a bandgap voltage reference value at the bandgap voltage reference output responsive to operations of the scaling amplifier.

In yet another example, a bandgap voltage reference circuit includes: a bandgap voltage reference (VBG) core having an input and first and second outputs; a first operational amplifier having an output and first and second inputs, the first input of the first operational amplifier coupled to the first output of the VBG core, and the second input of the first operational amplifier coupled to the second output of the VBG core; and a voltage divider having a first terminal, a second terminal, and an output terminal, the first terminal coupled to the output of the first operational amplifier, and the second terminal coupled to a ground terminal. The bandgap voltage reference circuit also includes: a second operational amplifier having an output and first and second inputs, the first input of the second operational amplifier coupled to the output terminal of the voltage divider; the second input of the second operational amplifier coupled to the input of the VBG core; and a transistor having a first terminal, a second terminal, and a control terminal, the first terminal of the transistor coupled to the output of the first operational amplifier, the second terminal of the transistor coupled to the input of the VBG core, and the control terminal of the transistor coupled to the output of the second operational amplifier.

DETAILED DESCRIPTION

Figure 1:
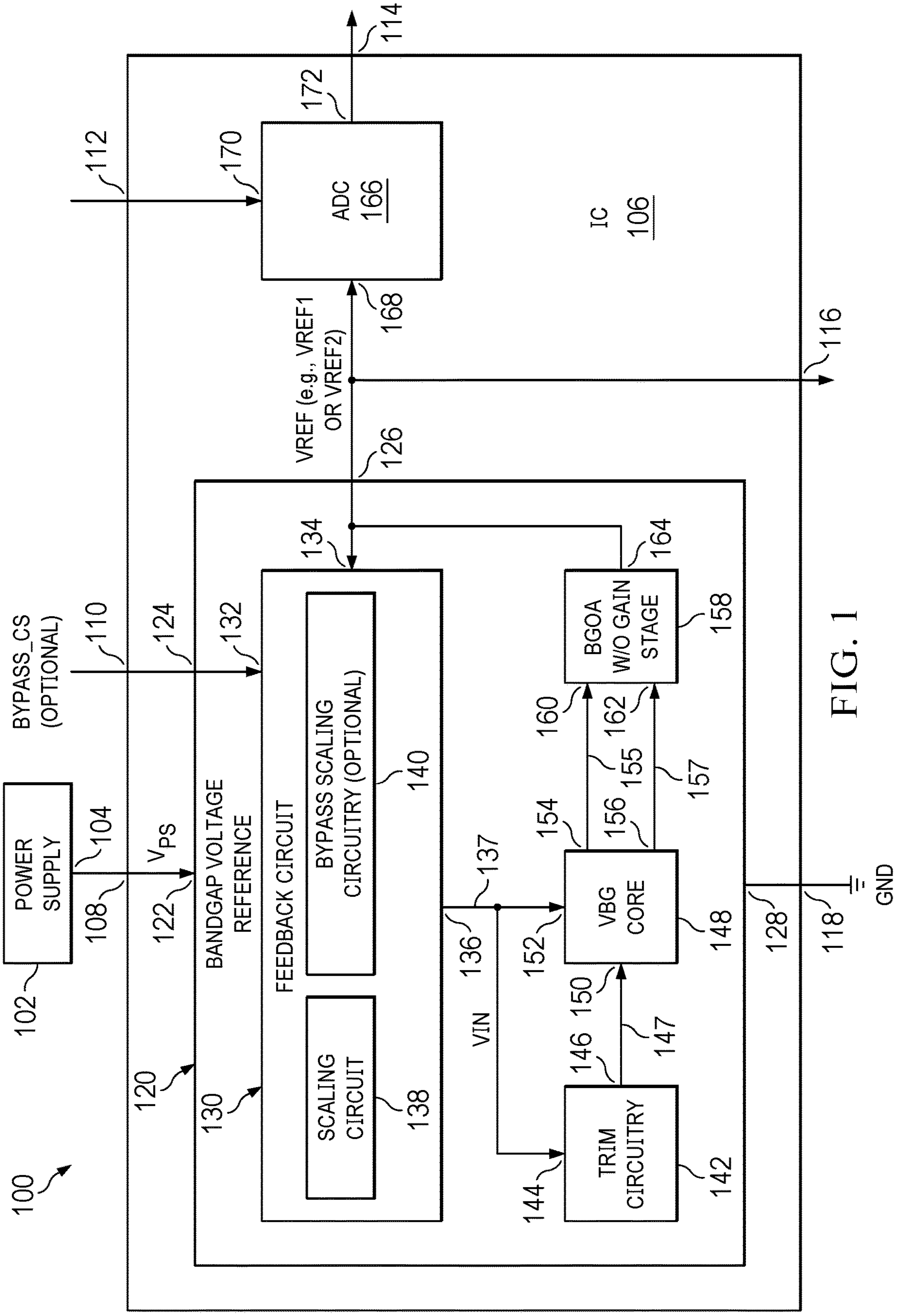
FIG. 1 is a block diagram showing an example system.

The same reference numbers or other reference designators are used in the drawings to designate the same or similar features. Such features may be the same or similar either by function and/or structure.

A first bandgap voltage reference (VBG) circuit topology includes a VBG core coupled to a trim circuit and an operational amplifier, where the output of the operational amplifier is the output of the VBG circuit and is a feedback input to the trim circuit and the VBG core. With this first VBG circuit topology, the voltage reference (VREF) output is the same as the input voltage (VIN).

A second VBG circuit topology includes similar components and arrangement, except the operational amplifier includes a gain stage and a resistor between its inverting input and its amplifier output. With this second VBG circuit topology, the VREF output is higher than VIN. Efforts to reduce the cost and increase the flexibility of VBG circuits are ongoing. The present figures and detailed description illustrate and describe example VBG circuits and a method of operating a VBG circuit that enable one or more benefits and/or address one or more shortcomings over the above first and second VBG circuits and other VBG circuits and/or methods of operating a VBG circuit.

FIG. 1 is a block diagram showing an example system 100. As shown, the system 100 includes a power supply 102 and an integrated circuit (IC) 106. The IC 106 includes a bandgap voltage reference circuit 120 and an analog-to-digital circuit (ADC) 166. The bandgap voltage reference circuit 120 includes a feedback circuit 130, trim circuitry 142, a bandgap voltage reference (VBG) core 148, and a bandgap operational amplifier (BGOA) 158. In some examples, the BGOA 158 does not include a gain stage. The feedback circuit 130 includes a scaling circuit 138 and bypass scaling circuitry 140. In some examples, the scaling circuit 138 includes a voltage divider and an operational amplifier. The bypass scaling circuitry 140 is optional and may be omitted in some examples.

In some examples, the power supply 102 has a power output 104. The IC 106 has a power input 108, an optional control input 110, a data input 112, a data output 114, a power output 116, and a ground terminal 118. The bandgap voltage reference circuit 120 has a power input 122, an optional control input 124, a power output 126, and a ground terminal 128. The feedback circuit 130 has an optional control input 132, a feedback input 134, and a feedback output 136. The trim circuitry 142 has a control input 144 and a trim output 146. The VBG core 148 has a control input 150, a power input 152, a first terminal 154, and a second terminal 156. The BGOA 158 includes a first terminal 160, a second terminal 162, and an amplifier output 164. The ADC 166 includes a power input 168, a data input 170, and a data output 172.

In the example of FIG. 1, the power output 104 of the power supply 102 is coupled to the power input 108 of the IC 106 and the power input 122 of the bandgap voltage reference circuit 120. The optional control input 110 of the IC 106 is coupled to the optional control input 124 of the bandgap voltage reference circuit 120 and the optional control input 132 of the feedback circuit 130. The power output 126 of the bandgap voltage reference circuit 120 is coupled to the power input 168 of the ADC 166. The power output 126 of the bandgap voltage reference circuit 120 is also coupled to the power output 116 of the IC 106. The ground terminal 118 of the IC 106 is coupled to the ground terminal 128 of the bandgap voltage reference circuit 120. The feedback input 134 of the feedback circuit 130 is coupled to the amplifier output 164 of the BGOA 158 and the power output 126 of the bandgap voltage reference circuit 120. The feedback output 136 of the feedback circuit 130 is coupled to the control input 144 of the trim circuitry 142 and the power input 152 of the VBG core 148. The trim output 146 of the trim circuitry 142 is coupled to the control input 150 of the VBG core 148. The first terminal 154 of the VBG core 148 is coupled to the first terminal 160 of the BGOA 158. The second terminal 156 of the VBG core 148 is coupled to the second terminal 162 of the BGOA 158. The data input 112 of the IC 106 is coupled to the data input 170 of the ADC 166. The data output 172 of the ADC 166 is coupled to the data output 114 of the IC 106.

In some examples, the power supply 102 operates to provide a power supply voltage (VPS) at the power output 104, and the ground terminal 118 is at an electrical ground, for example by being coupled to a ground plane of the IC 106. The IC 106 operates to: receive VPS at the power input 122; receive an optional bypass control signal (BYPASS_CS) at the optional control input 110; receive data at the data input 112; generate a bandgap voltage reference value (VREF) responsive to VPS, BYPASS_CS (if used), and the operations of the bandgap voltage reference circuit 120; provide VREF to the power output 116; and provide data to the data output 114 responsive to VREF, the data received at the data input 112, and the operations of the ADC 166. In some examples, VREF varies depending on whether or not the scaling circuit 138 is bypassed by the optional bypass scaling circuitry 140.

In some examples, the bandgap voltage reference circuit 120 operates to: receive VPS at the power input 122; regulate VPS to generate an input voltage (VIN) for components of the bandgap voltage reference circuit 120; receive BYPASS_CS (if used) at the optional control input 110; and provide VREF at the power output 126 responsive to VIN,BYPASS_CS (if used), and the operations of the VBG core 148, the trim circuitry 142, the BGOA 158, and the feedback circuit 130. In some examples, VIN (rather than VPS) is provided as an input to the bandgap voltage reference circuit 120. In such case, circuitry external to the bandgap voltage reference circuit 120 regulates VPS to generate VIN for the bandgap voltage reference circuit 120.

In some examples, the feedback circuit 130 operates to: receive VREF at the feedback input 134; receive BYPASS_CS (if used) at the optional control input 110; adjust VREF responsive to the operations of the scaling circuit 138 when not bypassed; and provide a feedback signal 137 to the feedback output 136 responsive to VREF and BYPASS_CS (if used). The feedback signal 137 is used to adjust VIN as needed. In the example of FIG. 1, the operations of the feedback circuit 130 are based on the scaling circuit 138 and the bypass scaling circuitry 140 (if used).

In some examples, the trim circuitry 142 operates to: receive VIN at the control input 144; and provide a trim signal 147 at the trim output 146 responsive to VIN. In some examples, the trim circuitry 142 provides first-order correction for the VBG core 148 to compensate for drift. In some examples, the trim circuitry 142 provides an anti-parabolic correction current to cancel a bandgap parabolic curve. In either case, the trim circuitry 142 provides a temperature drift trim by injecting current to the control input 150 of the VBG core 148.

In some examples, the VBG core 148 operates to: receive VIN at the power input 152; receive the trim signal 147 at the control input 150; provide a first signal 155 at the first terminal 154 responsive to VIN and the trim signal 147; and provide a second signal 157 at the second terminal 156 responsive to VIN and the trim signal 147. In some examples, the BG core 148 uses the voltage difference between two p-n junctions, operated at different current densities, to generate a current that is proportional to absolute temperature (PTAT) in a first resistor (e.g., R6 in FIG. 6). This current is used to generate a voltage in a second resistor (e.g., R4 in FIG. 6). This voltage in turn is added to the voltage of one of the p-n junctions (or a third one, in some implementations). The voltage across a p-n junction operated at constant current is complementary to absolute temperature (CTAT) with a known temperature coefficient. If the ratio between the first and second resistor is chosen properly, the first order effects of the temperature dependency of the p-n junctions and the PTAT current will cancel out.

In some examples, the BGOA 158 operates to: receive the first signal 155 at the first terminal 160; receive the second signal 157 at the second terminal 162; equalize the voltages at the first terminal 160 and the second terminal 162; and provide VREF at the amplifier output 164 responsive to the first signal 155 and the second signal 157.

In some examples, if the scaling circuit 138 of the feedback circuit 130 is not bypassed, VIN is less than VREF. If the scaling circuit 138 is bypassed, VIN is about the same as VREF. Relative to other bandgap voltage reference circuit topologies, the bandgap reference voltage circuit 120 of FIG. 1 with its feedback circuit 130 provides a cost-effective option for providing a VREF that is higher than VIN and/or providing an adjustable VREF. In some examples, VREF can be set to a first VREF value (VREF1) or a second VREF value (VREF2). For example, VREF1 may be approximately the same as VIN, while VREF2 is higher than VIN. In some examples, the ADC 166 has first mode and second mode options. The first mode is based on VREF1 and is more power efficient. The second mode is based on VREF2 and has better performance.

Figure 2:
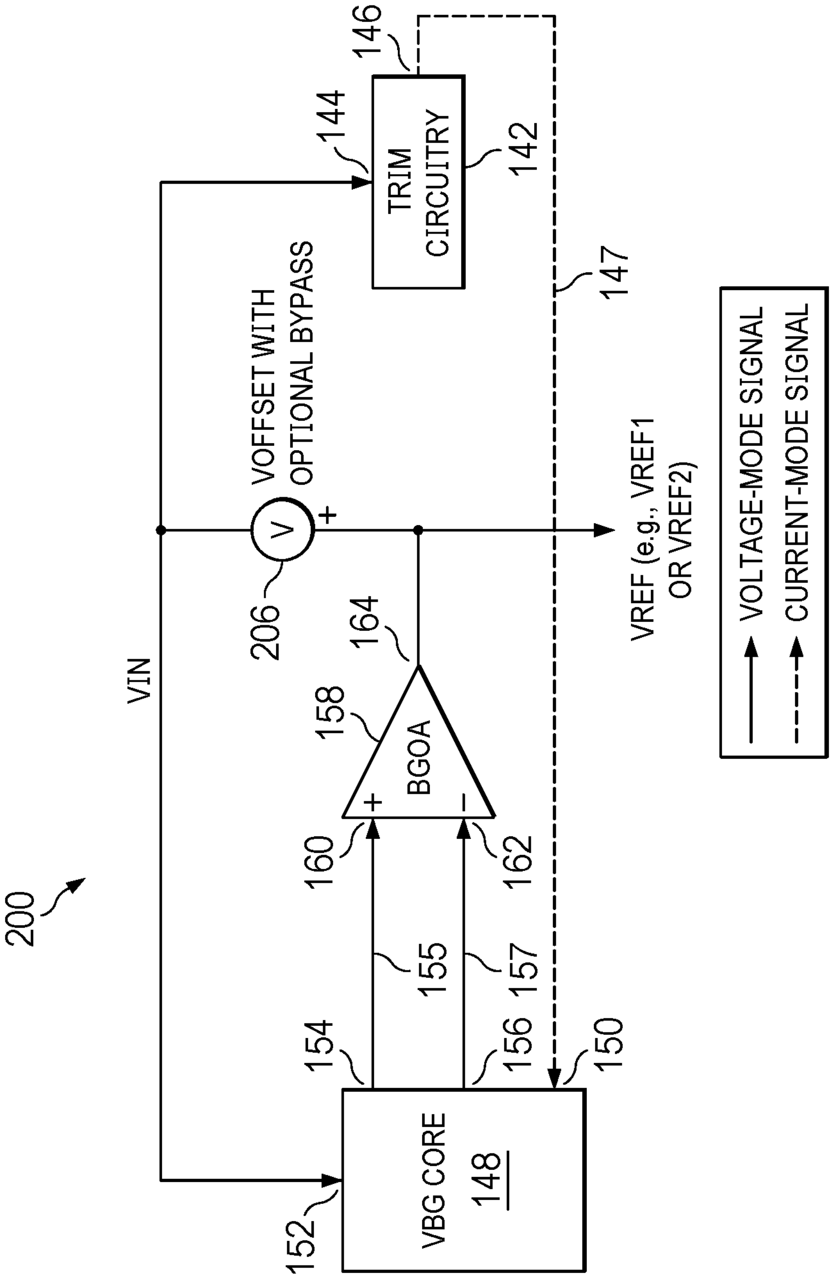
FIG. 2 is a schematic diagram showing an equivalent circuit of an example bandgap voltage reference circuit.

FIG. 2 is a schematic diagram showing an equivalent circuit 200 of an example bandgap voltage reference circuit such as the bandgap voltage reference circuit 120 of FIG. 1. The equivalent circuit 200 includes the trim circuitry 142, the VBG core 148, and the BGOA 158 described in FIG. 1. The trim circuitry 142, the VBG core 148, and the BGOA 158 have the respective inputs and outputs described in FIG. 1. In the example of FIG. 2, the trim signal 147 is a current-mode signal, while other signals are voltage-mode signals. As used herein, a "current-mode signal" refers to a signal that conveys information based on a current level or changes to a current level. As used herein, a "voltage-mode signal" refers to a signal that conveys information based on a voltage level or changes to a voltage level. As shown, the equivalent circuit 200 also includes a voltage source 206 between the amplifier output 164 of the BGOA 158 and a VIN source (not shown). In some examples, the voltage source 206 adds an offset voltage (VOFFSET) to VIN, resulting in VREF at the amplifier output 164 being higher than VIN. In such case, VREF may have a target value of VREF2. In other examples, the voltage source 206 is bypassed, resulting in VREF being about the same as VIN. In such case, VREF may have a target value of VREF1. In some examples, VIN=2.5V, VREF1=2.5V, and VREF2=4.096V. In other examples, the values for VIN, VREF1, and VREF2 may vary. The voltage source 206 of FIG. 2 is equivalent in function to a feedback circuit having a scaling circuit or scaling amplifier as described in FIGS. 1, 3, 4, 5A, 5B, and 6, but does not properly account for VIN variance, temperature variance, and loading variance.

Figure 3:
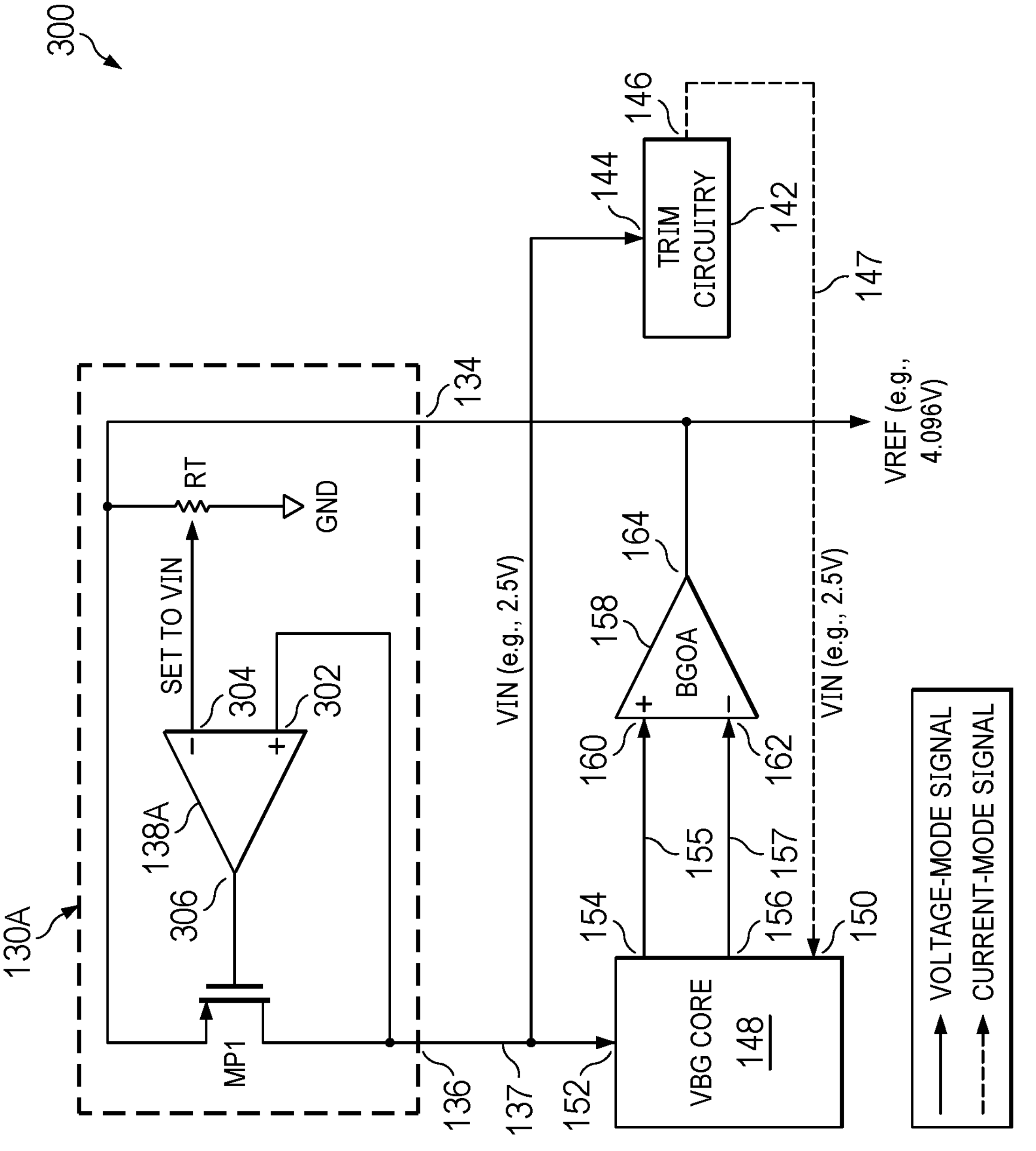
FIG. 3 is a schematic diagram showing an example bandgap voltage reference circuit.

FIG. 3 is a schematic diagram showing an example bandgap voltage reference circuit 300. As shown, the bandgap voltage reference circuit 300 includes the trim circuitry 142, the VBG core 148, the BGOA 158, and a feedback circuit 130A. The trim circuitry 142, the VBG core 148, and the BGOA 158 have the respective inputs, outputs, and function described in FIG. 1. In the example of FIG. 3, the trim signal 147 is a current-mode signal, while other signals are voltage-mode signals. The feedback circuit 130A of FIG. 3 is an example of the feedback circuit 130 in FIG. 1.

In the example of FIG. 3, the feedback circuit 130A includes a voltage divider RT, an operational amplifier 138A, and a transistor MP1. Together, the voltage divider RT, the operational amplifier 138A, and the transistor MP1 function as the scaling circuit 138 of FIG. 1. MP1 is a p-channel field effect transistor ("PFET") having a first terminal, a second terminal, and a control terminal. The operational amplifier 138A is referred to herein as a scaling amplifier due to its function in scaling VREF relative to VIN. Such scaling is also a function of the voltage divide RT and MP1. The scaling amplifier 138A has a non-inverting ("+") input 302, an inverting ("−") input 304, and a scaling amplifier output 306. The voltage divider RT has a first terminal, a second terminal, and an output terminal. In some examples, the first terminal of the voltage divider RT is coupled to the feedback input 134 of the feedback circuit 130A. The second terminal of the voltage divider RT is coupled to a ground (GND) terminal. In some examples, the output terminal of the voltage divider RT is coupled to the inverting ("−") input 304 of the scaling amplifier 138A. In some examples, the voltage divider includes an adjustable resistor having a first terminal and a second terminal, the first terminal coupled to the feedback input and the second terminal coupled to the output terminal of the voltage divider RT. Adjustment of the adjustable resistor enables VREF to be scaled to different values.

In examples, the non-inverting ("+") input 302 of the scaling amplifier 138A is coupled to the feedback output 136 of the feedback circuit 130A. The first terminal of the transistor MP1 is coupled to the feedback input 134. The second terminal of the transistor MP1 is coupled to the feedback output 136. The control terminal of the transistor MP1 is coupled to the scaling amplifier output 306 of the scaling amplifier 138A.

In the example of FIG. 3, the feedback circuit 130A operates to: receive VREF at the feedback input 134; scale VREF relative to VIN using the scaling amplifier 138A and the voltage divider RT; and provide a feedback signal 137 at the feedback output 136 responsive to VREF and the operations of the voltage divider RT, the scaling amplifier 138A, and the transistor MP1. The feedback signal 137 is used to adjust VIN. As shown, VIN is applied to the power input 152 of the VBG core 148 and the control input 144 of the trim circuitry 142 as described in FIG. 1. With the bandgap voltage reference circuit 300, VREF is higher than VIN. In some examples, VIN=2.5V and VREF=4.096V.

Figure 4:
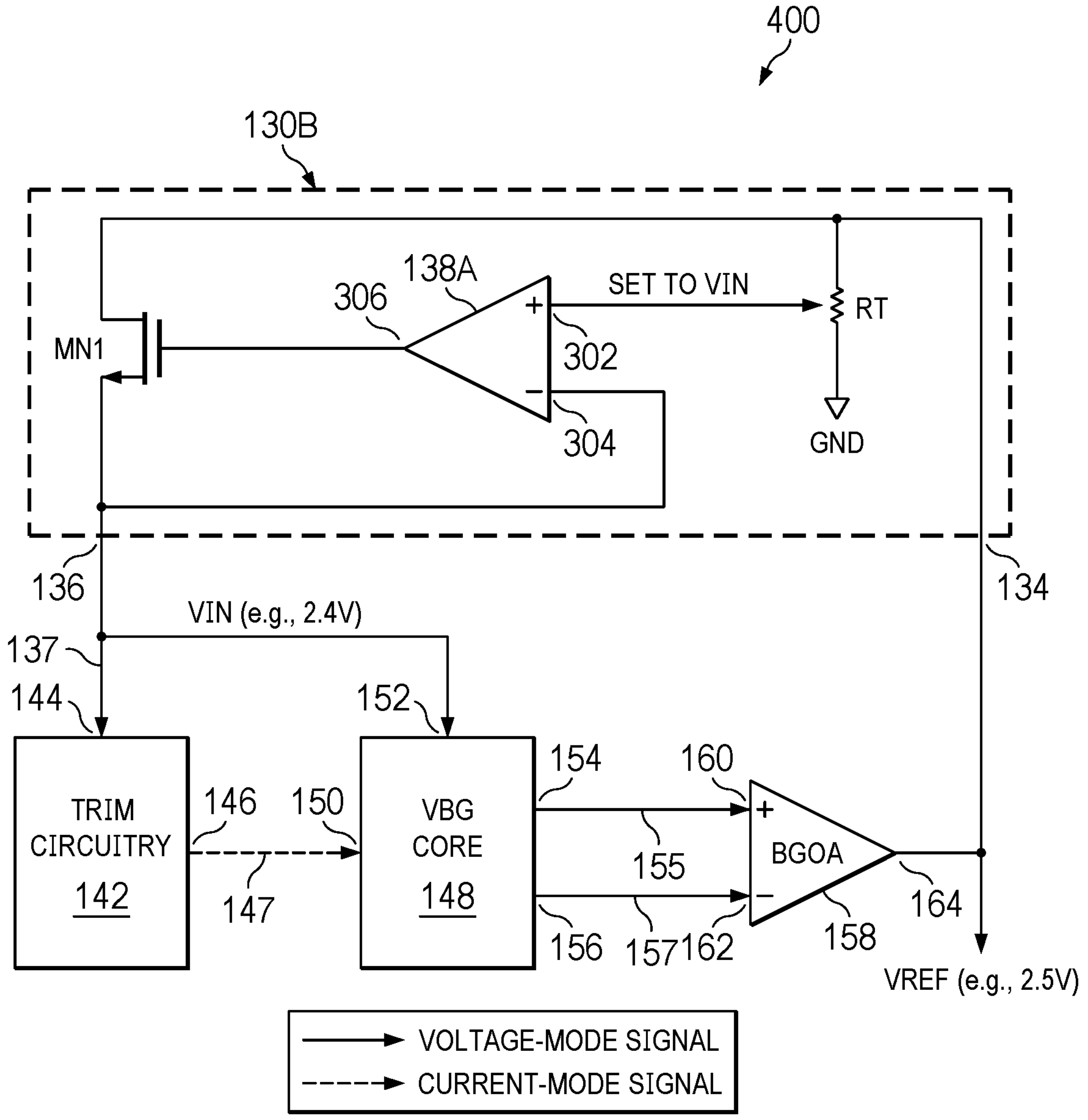
FIG. 4 is a schematic diagram showing another example bandgap voltage reference circuit.

FIG. 4 is a schematic diagram showing another example bandgap voltage reference circuit 400. As shown, the bandgap voltage reference circuit 400 of FIG. 4 includes the trim circuitry 142, the VBG core 148, the BGOA 158, and a feedback circuit 130B. The trim circuitry 142, the VBG core 148, and the BGOA 158 have the respective inputs, outputs, and function described in FIG. 1. Relative to the feedback circuit 130A of FIG. 3, the feedback circuit 130B of FIG. 4 is modified to replace transistor MP1 in the feedback circuit 130A of FIG. 3 with transistor MN1 in the feedback circuit 130B of FIG. 4. MN1 is a n-channel field effect transistor ("NFET") having a first terminal, a second terminal, and a control terminal.

In the example of FIG. 4, the feedback circuit 130B operates to: receive VREF at the feedback input 134; and provide a feedback signal 137 at the feedback output 136 responsive to VREF and the operations the voltage divider RT, the scaling amplifier 138A, and the transistor MN1. The feedback signal 137 is used to adjust VIN. As shown, VIN is applied to the power input 152 of the VBG core 148 and the control input 144 of the trim circuitry 142 as described in FIG. 1. With the bandgap voltage reference circuit 400, VREF is approximately the same as VIN. In some examples, VIN=2.5V and VREF=4.096V.

Figure 5A:
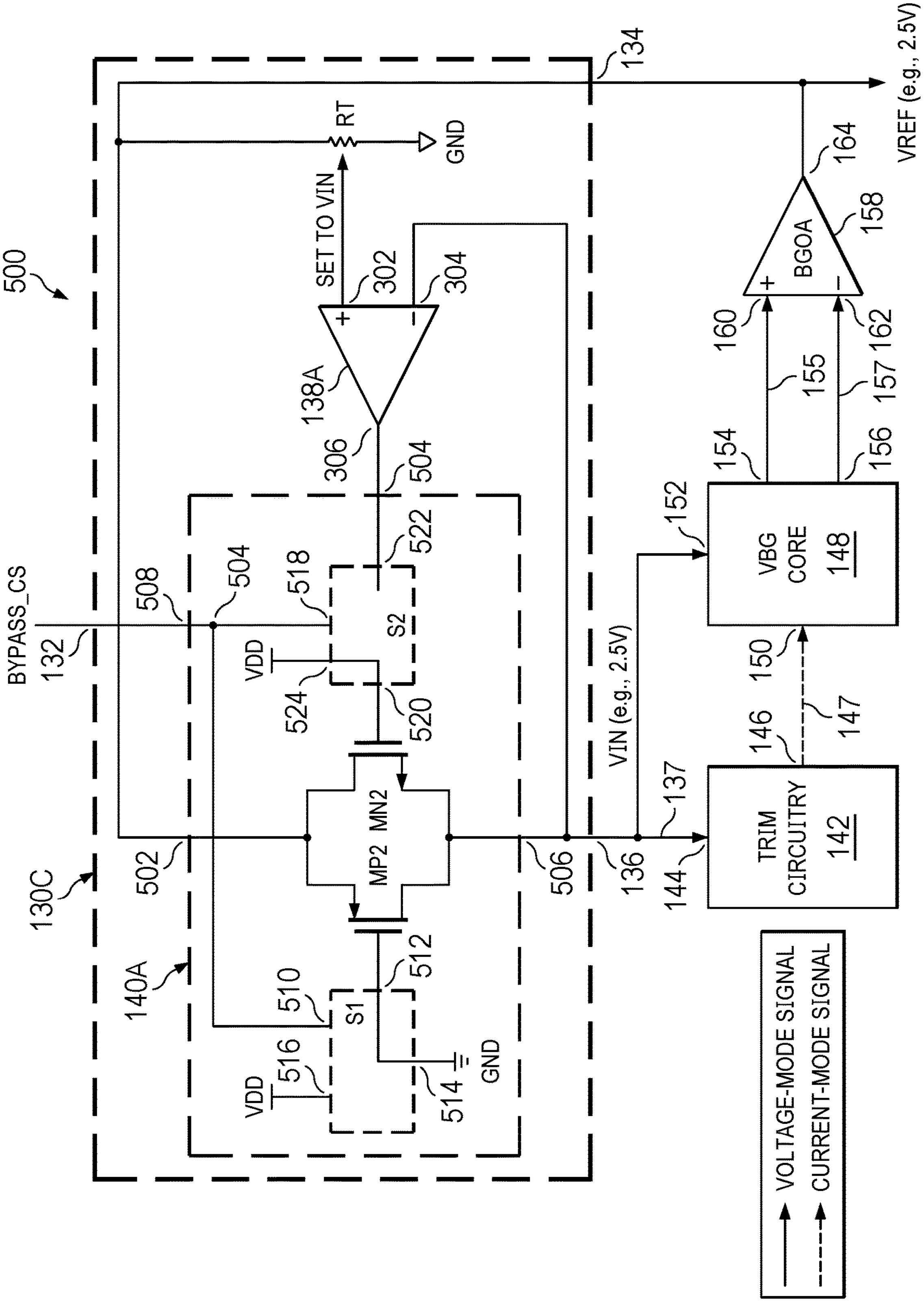
FIG. 5A is a schematic diagram showing another example bandgap voltage reference circuit, where the scaling amplifier of the feedback circuit is bypassed.

FIG. 5A is another example bandgap voltage reference circuit 500, wherein the scaling amplifier 138A of the feedback circuit 130C is bypassed. In FIG. 5A, the bandgap voltage reference circuit 500 includes the trim circuitry 142, the VBG core 148, the BGOA 158, and a feedback circuit 130C. The trim circuitry 142, the VBG core 148, and the BGOA 158 have the respective inputs and outputs described in FIG. 1. In the example of FIG. 5A, the trim signal 147 is a current-mode signal, while other signals are voltage-mode signals. The feedback circuit 130C of FIG. 5A is an example of the feedback circuit 130 in FIG. 1.

In the example of FIG. 5A, the feedback circuit 130C includes the scaling amplifier 138A, the voltage divider RT, and bypass scaling circuitry 140A. The bypass scaling circuitry 140A is an example of the bypass scaling circuitry 140 in FIG. 1. In the example of FIG. 5A, the bypass scaling circuitry 140A has a first bypass scaling circuitry input 502, a second bypass scaling circuitry input 504, a bypass scaling circuitry output 506, and a control input 508. The first bypass scaling circuitry input 502 is coupled to the feedback input 134 of the feedback circuit 130C. The second bypass scaling circuitry input 504 is coupled to the scaling amplifier output 306. The bypass scaling circuitry output 506 is coupled to the feedback output 136 of the feedback circuit 130C. The control input 508 of the bypass scaling circuitry 140A is coupled to the control input 132.

In some examples, the bypass scaling circuitry 140A includes a first switch S1, a second switch S2, a transistor MP2, and a transistor MN2. As shown, MP2 is a PFET having a first terminal, a second terminal, and a control terminal. MN2 is a NFET having a first terminal, a second terminal, and a control terminal. Together, MP2 and MN2 form a transmission gate such as a transmission gate such as the transmission gate 616 in FIG. 6. Together MP2 and MN2 function as a single switch with improved bi-directional current flow relative to using one PFET or one NFET.

In some examples, each of the first switch and the second switch includes three FETs. In some examples, each of the first switch and the second switch includes a transmission gate (similar to the transmission gate 616 in FIG. 6) and another transistor (e.g., a PFET or NFET). In some examples, inverters are used between the control input 508 and control terminals of one or more transistors of the first switch and/or the second switch. As shown, the first switch S1 includes a control terminal 510, a first terminal 512, a second terminal 514, and a third terminal 516. The second switch S2 includes a control terminal 518, a first terminal 520, a second terminal 522, and a third terminal 524.

The control terminal 510 of switch S1 is coupled to the control input 508 of the bypass scaling circuitry 140A. The first terminal 512 of switch S1 is coupled to the control terminal of MP2. The second terminal 514 of switch S1 is coupled to a ground terminal. The third terminal 516 of switch S1 is coupled to a power supply (VDD) source or terminal. The control terminal 518 of switch S2 is coupled to the control input 508 of the bypass scaling circuitry 140A. The first terminal 520 of switch S2 is coupled to the control terminal of MN2. The second terminal 522 of switch S2 is coupled to the scaling amplifier output 306 of the scaling amplifier 138A. The third terminal 524 of switch S2 is coupled to a VDD source or terminal. The first terminals of MP2 and MN2 are coupled to the first bypass scaling circuitry input 502. The second terminals of MP2 and MN2 are coupled to the bypass scaling circuitry output 506.

In the example of FIG. 5A, the feedback circuit 130C operates to: receive VREF at the feedback input 134; receive BYPASS_CS at the control input 132; and provide a feedback signal 137 at the feedback output 136 responsive to VREF, BYPASS_CS, and the operations of the voltage divider RT, the scaling amplifier 138A, and the bypass scaling circuitry 140A.

The bypass scaling circuitry 140A operates to: receive BYPASS_CS at the control input 508; and bypass the scaling amplifier 138A responsive to BYPASS_CS and the operations of switch S1, switch S2, transistor MP2, and transistor MN2. In some examples, switch S1 allows current flow between the first terminal 512 and the second terminal 514 responsive to BYPASS_CS having a first state indicating the scaling amplifier 138A is to be bypassed. In the example of FIG. 5A, switch S1 couples the control terminal of MP2 to a ground terminal (GND) responsive to BYPASS_CS having the first state indicating the scaling amplifier 138A is to be bypassed. In some examples, the first state is a logic “1” state and the second state is a logic “0” state.

In some examples, switch S2 allows current flow between the first terminal 520 and the third terminal 524 responsive to BYPASS_CS having the first state indicating the scaling amplifier 138A is to be bypassed. In the example of FIG. 5A, switch S2 couples the control terminal of MN2 to a VDD source or terminal responsive to BYPASS_CS having the first state indicating the scaling amplifier 138A is to be bypassed.

When the scaling amplifier 138A is bypassed, VIN and VREF are about the same. In some examples, VIN and VREF are approximately 2.5V when the scaling amplifier 138A is bypassed by the bypass scaling circuitry 140A. In some examples, when VREF=2.5V, VDD may be approximately 2.85V to 5.5V. In some examples, when VREF=4.096V, VDD may be approximately 4.5V to 5.5V. Together MP2 and MN2 function as a single switch with improved bi-directional current flow relative to using one PFET or one NFET.

The bandgap voltage reference circuit 500 operates to: receive VIN at the control input 144 of the trim circuitry 142; receive VIN at the power input 152 of the VBG core 148; provide VREF responsive to VIN and the operations of the trim circuitry 142, the VBG core 148, and the BGOA 158; and adjust VIN responsive to VREF and the operations of the feedback circuit 130C.

Figure 5B:
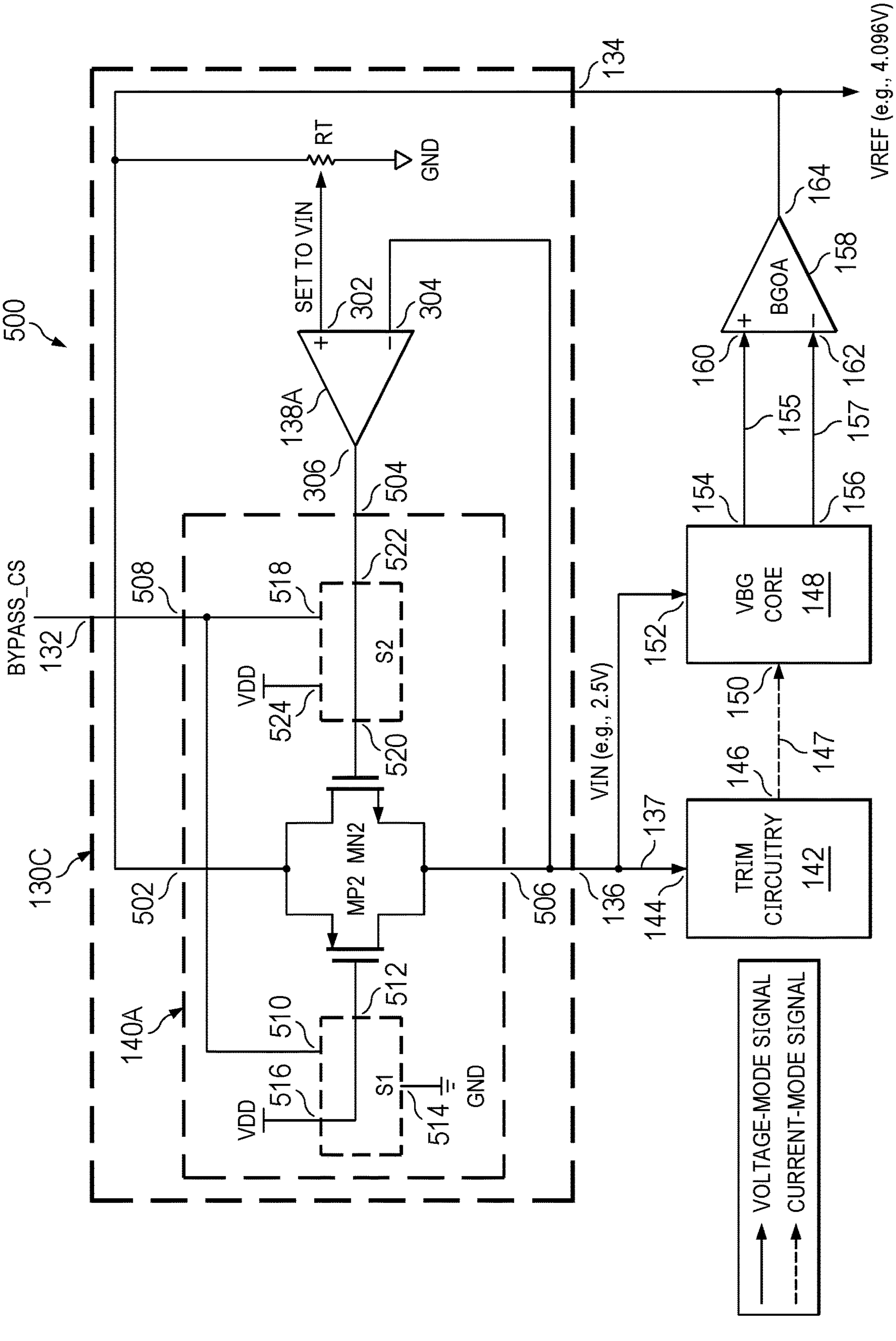
FIG. 5B is a schematic diagram showing the bandgap voltage reference circuit of FIG. 5A, where the scaling amplifier of the feedback circuit is not bypassed.

FIG. 5B is a schematic diagram showing the bandgap voltage reference circuit 500 of FIG. 5A, where the scaling amplifier 138A of the feedback circuit 130A is not bypassed. In such case, the bypass scaling circuitry 140A operates to: receive BYPASS_CS at the control input 508; and not bypass the scaling amplifier 138A responsive to BYPASS_CS and the operations of switches S1 and S2. In some examples, switch S1 allows current flow between the first terminal 512 and the third terminal 516 responsive to BYPASS_CS having a second state indicating the scaling amplifier 138A will be used (not bypassed). In the example of FIG. 5B, switch S1 couples the control terminal of MP2 to a VDD source or terminal responsive to BYPASS_CS having the second state indicating the scaling amplifier 138A will be used.

In some examples, switch S2 allows current flow between the first terminal 520 and the second terminal 522 responsive to BYPASS_CS having the second state indicating the scaling amplifier 138A will be used. In the example of FIG. 5B, switch S2 couples the control terminal of MN2 to the second bypass scaling circuitry input 504 responsive to BYPASS_CS having the second state indicating the scaling amplifier 138A will be used.

Again, the second bypass scaling circuitry input 504 is coupled to the scaling amplifier output 306. When the scaling amplifier 138A is used, VIN is less than VREF. In some examples, VIN=2.5V and VREF=4.096V when the scaling amplifier 138A is not bypassed by the bypass scaling circuitry 140A. In some examples, when VREF=2.5V, VDD may be approximately 2.85V to 5.5V. In some examples, when VREF=4.096V, VDD may be approximately 4.5V to 5.5V. Together MP2 and MN2 function as a single switch with improved bi-directional current flow relative to using one PFET or one NFET.

Figure 6:
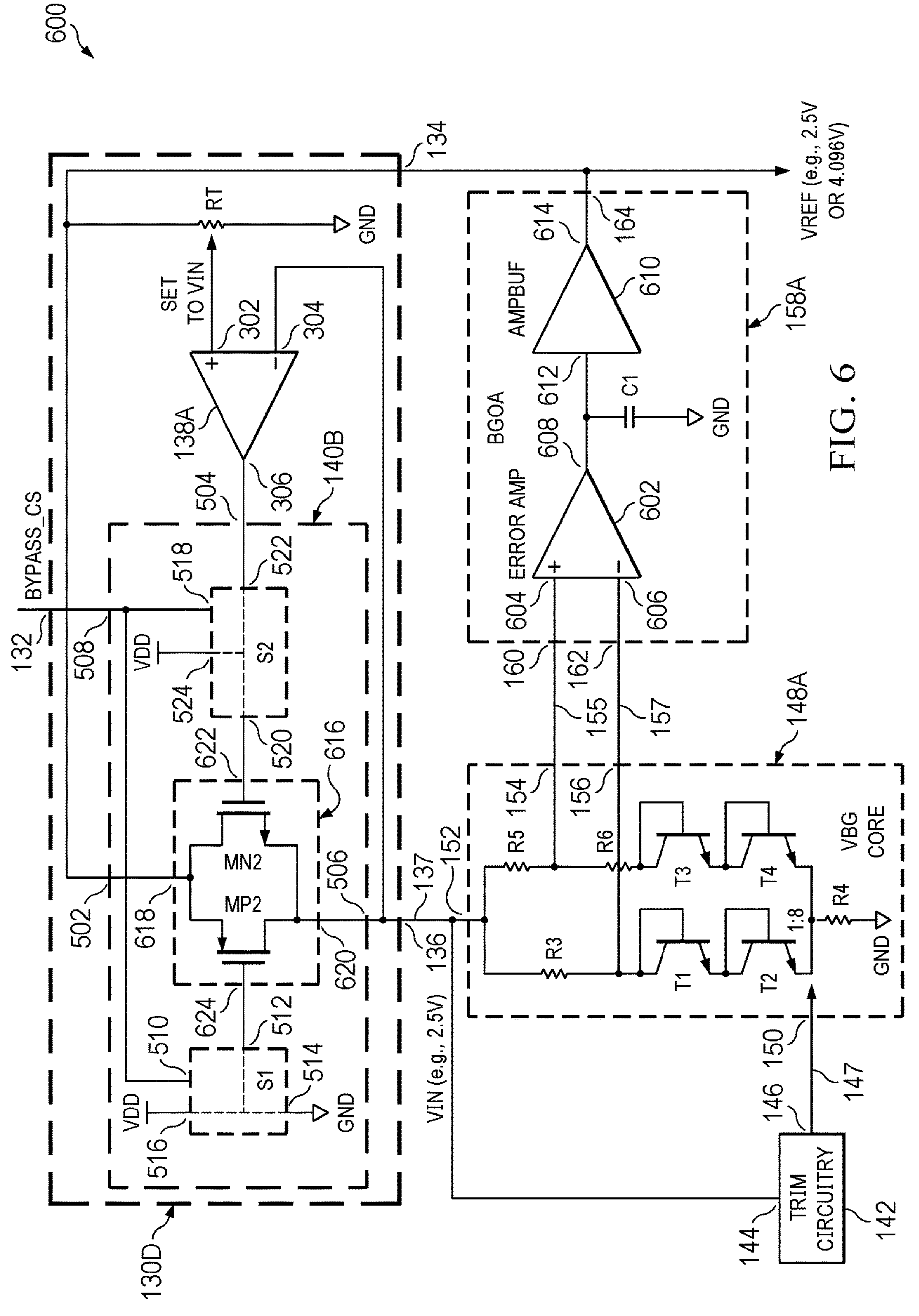
FIG. 6 is a schematic diagram showing another example bandgap voltage reference circuit.

FIG. 6 is a schematic diagram showing another example bandgap voltage reference circuit 600. As shown, the bandgap voltage reference circuit 600 includes the trim circuitry 142, a VBG core 148A, a BGOA 158A, and a feedback circuit 130D. The trim circuitry 142, the VBG core 148A, and the BGOA 158A have the respective inputs and outputs described in FIG. 1. The feedback circuit 130D of FIG. 6 is an example of the feedback circuit 130 in FIG. 1. In some examples, the feedback circuit 130D of FIG. 6 is the same as the feedback circuit 130C in FIGS. 5A and 5B, except that MP2 and MN2 of the bypass scaling circuitry 140B are shown as components of a transmission gate 616 in FIG. 6.

The transmission gate 616 has a first terminal 618, a second terminal 620, a first control terminal 622, and a second control terminal 624. The first terminal 618 of the transmission gate 616 is coupled to the first bypass scaling circuitry input 502. The second terminal 620 of the transmission gate 616 is coupled to the bypass scaling circuitry output 506. The first control terminal 622 of the transmission gate 616 is coupled to the first terminal 520 of the switch S2. The second control terminal 624 of the transmission gate 616 is coupled to the first terminal 512 of the switch S1.

In the example of FIG. 6, the VBG core 148A includes resistors R3, R4, R5, and R6, and transistors T1, T2, T3, and T4 in the arrangement shown. Also, the BGOA 158A includes an error amplifier 602, a capacitor C1, and an amplifier buffer 610 in the arrangement shown.

In the VBG core 148A, each of the resistors R3, R4, R5, and R5 has a respective first terminal and a respective second terminal. Also, each of the transistors T1, T2, T3, and T4 has a respective first terminal, a respective second terminal, and a respective control terminal. As shown, the VBG core 148A includes R3, T1, T2, and R4 in series between the power input 152 and a ground terminal. In other words, the first terminal of R3 is coupled to the power input 152. The second terminal of R2 is coupled to the first terminal of T1. The second terminal of T1 is coupled to the first terminal of T2. The second terminal of T2 is coupled to the first terminal of R4. The second terminal of R4 is coupled to the ground terminal. The control terminal of T1 is coupled the first terminal of T1. The control terminal of T2 is coupled the first terminal of T2. In some examples, the second terminal 156 of the VBG core 148A is coupled to a node between the second terminal of R3 and the first terminal of T1.

The VBG core 148A also includes R5, R6, T3, T4, and R4 in series between the power input 152 and the ground terminal. In other words, the first terminal of R5 is coupled to the power input 152. The second terminal of R5 is coupled to the first terminal of R6. The second terminal of R6 is coupled to the first terminal of T3. The second terminal of T3 is coupled to the first terminal of T4. The second terminal of T4 is coupled to the first terminal of R4. Again, the second terminal of R4 is coupled to the ground terminal. The control terminal of T3 is coupled the first terminal of T3. The control terminal of T4 is coupled the first terminal of T4. In some examples, the first terminal 154 of the VBG core 148A is coupled to a node between the second terminal of R5 and the first terminal of R6.

In the BGOA 158A, the error amplifier 602 is an operational amplifier that includes a non-inverting ("+") input 604, an inverting ("−") input 606, and an error amplifier output 608. The capacitor C1 has a first terminal and a second terminal. The amplifier buffer 610 has a buffer input 612 and a buffer output 614. As shown, the non-inverting ("+") input 604 of the error amplifier 602 is coupled to the first terminal 160 of the BGOA 158A. The inverting ("−") input 606 of the error amplifier 602 is coupled to the second terminal 162 of the BGOA 158A. The first terminal of C1 is coupled to the error amplifier output 608 and the buffer input 612. The second terminal of C1 is coupled to a ground terminal. The buffer output 614 is coupled to the amplifier output 164 of the BGOA 158A.

In the example of FIG. 6, the feedback circuit 130D operates to: receive VREF at the feedback input 134; receive BYPASS_CS at the control input 132; and provide a feedback signal 137 at the feedback output 136 responsive to VREF, BYPASS_CS, and the operations of the voltage divider RT, the scaling amplifier 138A, and the bypass scaling circuitry 140B.

The bypass scaling circuitry 140B operates to: receive BYPASS_CS at the control input 508; selectively bypass the scaling amplifier 138A responsive to BYPASS_CS and the operations of switch S1, switch S2, and the transmission gate 616. In some examples, switch S1 allows current flow between the first terminal 512 and the second terminal 514 responsive to BYPASS_CS having the first state indicating the scaling amplifier 138A is to be bypassed. When BYPASS_CS has a second state indicating the scaling amplifier 138A is to be used, switch S1 allows current flow between the first terminal 512 and the third terminal 516. In the example of FIG. 6, switch S1 couples the second control terminal 624 of the transmission gate 616 to a ground terminal responsive to BYPASS_CS having the first state indicating the scaling amplifier 138A is to be bypassed. When BYPASS_CS has the second state indicating the scaling amplifier 138A is to be used, switch S1 couples the second control terminal 624 of the transmission gate 616 to a VDD source or terminal.

In some examples, switch S2 allows current flow between the first terminal 520 and the third terminal 524 responsive to BYPASS_CS having the first state indicating the scaling amplifier 138A is to be bypassed. When BYPASS_CS has the second state indicating the scaling amplifier 138A is to be used, switch S2 allows current flow between the first terminal 520 and the second terminal 522. In the example of FIG. 6, switch S2 couples the first control terminal 622 of the transmission gate 616 to a VDD source or terminal responsive to BYPASS_CS having the first state indicating the scaling amplifier 138A is to be bypassed. When BYPASS_CS has the second state indicating the scaling amplifier 138A is to be used, switch S2 couples the first control terminal 622 of the transmission gate 616 to the scaling amplifier output 306 of the scaling amplifier 138A.

When the scaling amplifier 138A is bypassed by the bypass scaling circuitry 140B, VIN and VREF are about the same. In some examples, VIN and VREF are approximately 2.5V when the scaling amplifier 138A is bypassed. When the scaling amplifier 138A is not bypassed, VIN is less than VREF. In some examples, VIN=2.5V and VREF=4.096V when the scaling amplifier 138A is not bypassed by the bypass scaling circuitry 140B.

In some examples, the bandgap voltage reference circuit 600 operates to: receive VIN at the control input 144 of the trim circuitry 142; receive VIN at the power input 152 of the VBG core 148A; provide VREF responsive to VIN and the operations of the trim circuitry 142, the VBG core 148A, and the BGOA 158A; and adjust VIN responsive to VREF and the operations of the feedback circuit 130D. In some examples, the error amplifier 602 forces the first terminal 154 and the second terminal 156 of the VBG core 148A to be equal in voltage potential. The current through R6 of the VBG core 148A is VBE/R6, which is CTAT. Meanwhile, the bipolar transistor collector current of the VBG core 148A is PTAT in nature. By adding CTAT with PTAT, the VBG core 148A provides a fairly constant over-temperature voltage (bandgap voltage). In the described examples, a VIN of 2.5V is targeted as a basic bandgap core design. If 2.5V VREF is desired, BYPASS_CS is set high to turn on both MN2 and MP2. If a VREF higher than 2.5V (e.g., 4.096V) is desired, BYPASS_CS is set low and the scaling amplifier 138A is activated to drive the gate of MN2 to accomplish the scaling operation. As desired, VREF can be varied by adjusting the division ratio of the voltage divider RT.

Figure 7:
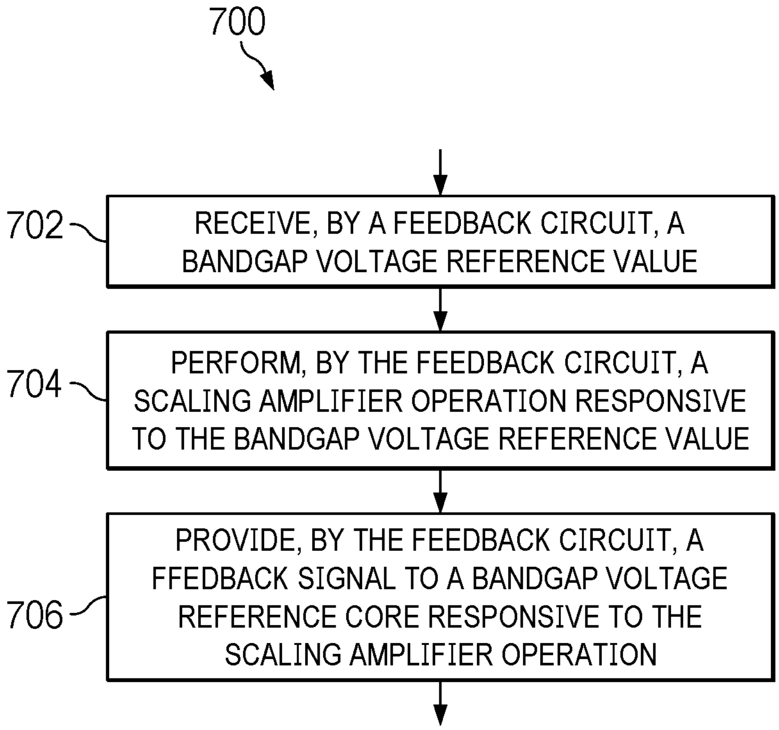
FIG. 7 is a flowchart showing an example method of operating a bandgap voltage reference circuit.

FIG. 7 is a flowchart showing an example bandgap voltage reference circuit method 700. As shown, the method 700 includes receiving, by a feedback circuit, a bandgap voltage reference value (e.g., VREF herein) at block 702. In different examples, the feedback circuit 130 in FIG. 1, the feedback circuit 130A in FIG. 3, the feedback circuit 130B in FIG. 4, the feedback circuit 130C in FIGS. 5A and 5B, or the feedback circuit 130D in FIG. 6 is used with the method 700. At block 704, a scaling amplifier operation is performed by the feedback circuit responsive to VREF. At block 706, a feedback signal is provided by the feedback circuit to a VBG core responsive to the scaling amplifier operation. In some examples, the feedback signal of block 706 is the feedback signal 137 in FIGS. 1, 3, 4, 5A, 5B, and 6. In some examples, the VBG core of block 706 is the VBG core 148 in FIGS. 1, 3, 4, 5A, and 5B, or the VBG core 148A in FIG. 6.

In some examples, the method 700 may include additional or alternative steps. In some examples, providing the feedback signal at block 706 includes controlling a switch responsive to the scaling amplifier operation. In some examples, the method 700 includes bypassing, by the feedback circuit, the scaling amplifier operations responsive to a bypass scaling control signal.

In some examples, the feedback circuit related to method 700 includes a scaling amplifier and a transmission gate having first and second control terminals. In such examples, the method 700 includes: connecting a power supply terminal to the first control terminal responsive to the bypass scaling control signal having a first state; connecting a ground terminal to the first control terminal responsive to the bypass scaling control signal having a second state different than the first state; connecting an output of the scaling amplifier to the second control terminal responsive to the bypass scaling control signal having the first state; and connecting the ground terminal to the second control terminal responsive to the bypass scaling control signal having the second state.

In some examples, the method 700 includes: providing a first bandgap voltage reference value responsive to the feedback circuit bypassing the scaling amplifier operations; and providing a second bandgap voltage reference value responsive to the feedback circuit not bypassing the scaling amplifier operations, the second bandgap voltage reference value greater than the first bandgap voltage reference value. In such examples, the first bandgap voltage reference value may be when VREF=VREF1 and the second bandgap voltage reference value may be when VREF=VREF2. Without limitation, VREF1 is 2.5V and VREF2 is 4.096V in some examples.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") such as an NFET or a PFET, a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control terminal and its first and second terminals. In the context of a FET, the control terminal is the gate, and the first and second terminals are the drain and source. In the context of a BJT, the control terminal is the base, and the first and second terminals are the collector and emitter.

References herein to a FET being "ON" means that the conduction channel of the FET is present and drain current may flow through the FET. References herein to a FET being "OFF" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described examples, and other examples are possible, within the scope of the claims.

What is claimed is:

1. A bandgap voltage reference circuit comprising:

a bandgap voltage reference (VBG) core having a power input and first and second terminals;

a bandgap operational amplifier (BGOA) having an output and first and second terminals, the first terminal of the BGOA coupled to the first terminal of the VBG core, and the second terminal of the BGOA coupled to the second terminal of the VBG core; and a feedback circuit having a feedback input and a feedback output, the feedback input coupled to the operational amplifier output, the feedback output coupled to the power input, the feedback circuit including a scaling amplifier having an inverting input, a non-inverting input, and a scaling amplifier output;

wherein the feedback circuit includes a transmission gate having a first terminal, a second terminal, and a control terminal, the first terminal coupled to the feedback input, the second terminal coupled to the feedback output, and the control terminal coupled to scaling amplifier output;

wherein feedback circuit further includes a control input, and a switch having a first terminal, a second terminal, a third terminal, and a control terminal, the first terminal of the switch coupled to a power supply terminal, the second terminal of the switch coupled to the control terminal of the transmission gate, the third terminal of the switch coupled to the scaling amplifier output, and the control terminal of the switch coupled to the control input.

2. The bandgap voltage reference circuit of claim 1, wherein the switch is a first switch, the control terminal of the transmission gate is a first control terminal, the transmission has a second control terminal, the feedback circuit includes a second switch having a first terminal, a second terminal, a third terminal and a control terminal, the first terminal of the second switch coupled to the second control terminal of the transmission gate, the second terminal of the second switch coupled to a ground terminal, the third terminal of the second switch coupled a power supply terminal, and the control terminal of the second switch coupled to the control input.

3. The bandgap voltage reference circuit of claim 1, wherein the feedback circuit includes bypass scaling circuitry having a first bypass scaling circuitry input, a second bypass scaling circuitry input, a bypass scaling circuitry output, and a control input, the first bypass scaling circuitry input coupled to the feedback input, the second bypass scaling circuitry input coupled to the scaling amplifier output, and the bypass scaling circuitry output coupled to the feedback output.

4. A bandgap voltage reference circuit comprising:

a bandgap voltage reference (VBG) core having an input and first and second outputs;

a first operational amplifier having an output and first and second inputs, the first input of the first operational amplifier coupled to the first output of the VBG core, and the second input of the first operational amplifier coupled to the second output of the VBG core; a voltage divider having a first terminal, a second terminal, and an output terminal, the first terminal coupled to the output of the first operational amplifier, and the second terminal coupled to a ground terminal;

a second operational amplifier having an output and first and second inputs, the first input of the second operational amplifier coupled to the output terminal of the voltage divider; the second input of the second operational amplifier coupled to the input of the VBG core; and a transistor having a first terminal, a second terminal, and a control terminal, the first terminal of the transistor coupled to the output of the first operational amplifier, the second terminal of the transistor coupled to the input of the VBG core, and the control terminal of the transistor coupled to the output of the second operational amplifier.

5. The bandgap voltage reference circuit of claim 4, wherein the transistor is a p-channel field-effect transistor (PFET), the first terminal is a source terminal, and the second terminal is a drain terminal.

6. The bandgap voltage reference circuit of claim 4, wherein the transistor is an n-channel field-effect transistor (NFET), the first terminal is a drain terminal, and the second terminal is a source terminal.

7. The bandgap voltage reference circuit of claim 4, wherein the transistor is part of a bypass circuit, the bypass circuit including a switch having a first terminal, a second terminal, a third terminal, and a control terminal, the first terminal of the switch coupled to the control terminal of the transistor, the second terminal of the switch coupled to the output of the second operational amplifier, and the third terminal of the switch coupled to a power supply terminal.

8. The bandgap voltage reference circuit of claim 7, wherein the transistor is a first transistor, the switch is a first switch, the bypass circuit includes a second transistor and a second switch, the second transistor has a first terminal, a second terminal, and a control terminal, the second switch has a first terminal, a second terminal, a third terminal, and a control terminal, the first terminal of the second transistor is coupled to the output of the first operational amplifier, the second terminal of the second transistor is coupled to the input of the VBG core, the first terminal of the second switch is coupled to the control terminal of the second transistor, the second terminal of the second switch is coupled to a ground terminal, and the third terminal of the second switch is coupled to a power supply terminal.

9. The bandgap voltage reference circuit of claim 4, wherein transistor is a first transistor, and the VBG core includes:

a first resistor, a second transistor, a third transistor, and a second resistor in series between the input of the VBG core and a ground terminal; and a third resistor, a fourth resistor, a fourth transistor, a fifth transistor, and the second resistor between the input of the VBG core and the ground terminal.

10. The bandgap voltage reference circuit of claim 4, wherein first operational amplifier includes an operational amplifier having an output and first and second inputs, a capacitor having a first and second terminals, and a buffer circuit having an input and an output, the first input of the operational amplifier coupled to the first input of the first operational amplifier, the second input of the operational amplifier coupled to the second input of the first operational amplifier, the output of the operational amplifier coupled to the first terminal of the capacitor and the input of the buffer circuit, the second terminal of the capacitor coupled to a ground terminal, and the output of the buffer circuit coupled to the output of the first operational amplifier.

* * * * *